United States Patent [19]

Masuda et al.

[11] Patent Number: 4,692,619
[45] Date of Patent: Sep. 8, 1987

[54] PYROELECTRIC TYPE DETECTING DEVICE

[75] Inventors: Noboru Masuda, Kawaguchi; Kenji Tomaki, Kawasaki; Tetsuo Oosawa, Tokyo; Michihiro Murata, Kyoto, all of Japan

[73] Assignee: Murata Manufacturing Co., Ltd., Japan

[21] Appl. No.: 876,182

[22] Filed: Jun. 19, 1986

[30] Foreign Application Priority Data

Jun. 20, 1985 [JP] Japan .............................. 60-93838[U]

[51] Int. Cl.⁴ .............................................. G01J 1/00
[52] U.S. Cl. ..................................... 250/338; 250/342
[58] Field of Search ............ 250/338 PY, 338 R, 342; 340/565, 567

[56] References Cited

U.S. PATENT DOCUMENTS

| 4,447,726 | 5/1984 | Mudge et al. | 250/342 |
| 4,459,484 | 7/1984 | Tar | 250/338 |
| 4,575,633 | 3/1986 | Baker et al. | 250/338 |
| 4,618,776 | 10/1986 | Stürm et al. | 250/372 |

Primary Examiner—Janice A. Howell
Attorney, Agent, or Firm—Ostrolenk, Faber, Gerb & Soffen

[57] ABSTRACT

A pyroelectric type detecting device including a converging mirror, a pyroelectric type sensor element for detecting light converged by the converging mirror, an amplifier for amplifying an output signal of the sensor element and a casing for accommodating the sensor element and the amplifier. The sensor element has a window for receiving the light and the casing is rotatably mounted on a portion of the converging mirror such that the window of the sensor element confronts a mirror member of the converging mirror.

4 Claims, 6 Drawing Figures

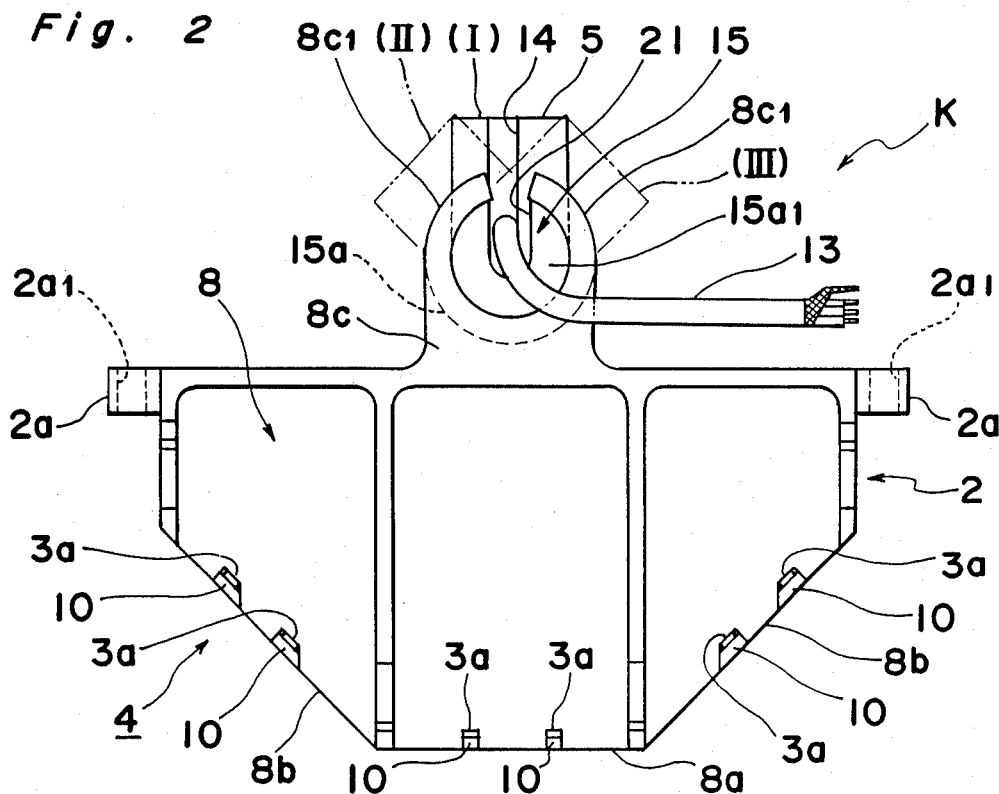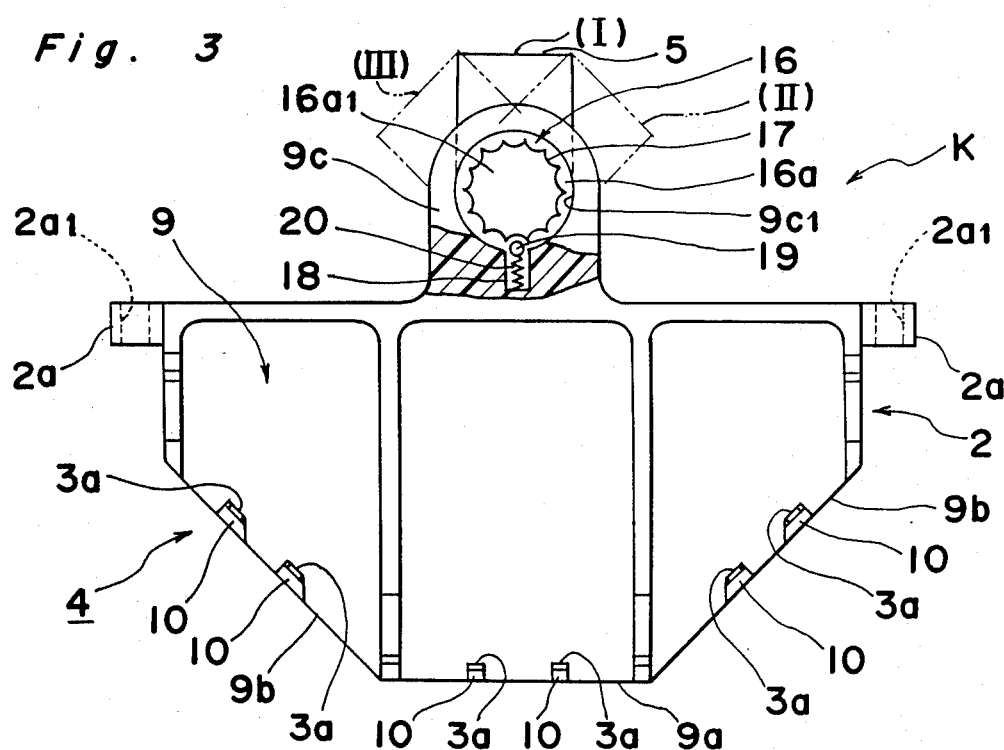

PYROELECTRIC TYPE DETECTING DEVICE

BACKGROUND OF THE INVENTION

The present invention generally relates to detecting devices and more particularly, to a pyroelecric type detecting device for detecting infrared rays or the like through their convergence by a converging mirror.

Generally, infrared sensors for detecting infrared rays are divided into a quantum type utilizing photoelectric effect of semiconductors and a thermal type utilizing thermoelectric effect or pyroelectric effect. The quantum type infrared sensors are quite highly sensitive. However, since response wavelength range of the quantum type infrared sensors is narrow and the quantum type infrared sensors are required to be cooled for detecting infrared rays, the quantum type infrared sensors are not widely used. On the other hand, detection sensitivity of the thermal type infrared sensors is low. However, the thermal type infrared sensors have such a feature as functioning at room temperature without dependence upon wavelength. Therefore, recently, the thermal type infrared sensors, especially the pyroelectric type infrared sensors are widely used in various fields.

The pyroelectric type infrared sensors are a kind of temperature sensors for detecting temperatures through utiliziation of pyroelectric effect that when temperature change is caused in pyroelectric crystals, electric charge is produced on the surfaces of the pyroelectric crystals upon spontaneous polarization. The pyroelectric type infrared sensors are used for detecting human bodies, flames and temperatures. As will be seen from the above described operational principle that temperature change is detected by electric charge produced on the surfaces of the pyroelectric crystals, the pyroelectric type infrared sensors have such drawbacks as high impendance and susceptibilty to external noises. Thus, in a pyroelecric type detecting device employing the pyroelectric type infrared sensor, it has been so arranged that a conveying mirror is provided in the vicinity of a mounting portion of the pyroelectric type infrared sensor so as to converge upon the pyroelectric type infrared sensor, infrared rays emitted by a source generating the infrared rays such that a signal-to-noise (S/N) ratio is increased.

In the known pyroelectric type detecting device referred to above, the pyroelectric type infrared sensor is secured to a frame or the like having the converging mirror attached thereto and the frame is angularly adjustably mounted such that a direction of incidence of infrared rays can be set arbitrarily. However, if the frame is angularly adjustably mounted such that infrared rays are set at a direction of incidence as described above, such problems arise due to relatively large size of the frame having the converging mirror attached thereto that a range of directions of incidence of infrared rays is restricted and a site for mounting the pyroelectric type detecting device is limited.

In order to eliminate such problems of the known pyroelectric type detecting device, it will be considered that the pyroelectric type infrared sensor smaller in size than the frame for the converging mirror is arranged to be moved relative to the frame so as to adjust the direction of incidence of infrared rays. However, in this case, a lead wire (usually, a shielding wire) extending from the pyroelectric type infrared sensor to an amplifier for amplifying an output of the pyroelectric type infrared sensor is displaced through positional adjustment of the pyroelectric type infrared sensor, thereby resulting in change of stray capacitance of the lead wire. The pyroelectric type infrared sensor has a high impedance as described above. Thus, when the stray capacitance of the lead wire changes, noise components inputted to the pyroelectric type infrared sensor vary and thus, such an inconvenience is incurred that an S/N ratio of an input signal to the amplifier changes according to adjusted positions of the pyroelectric type infrared sensor.

SUMMARY OF THE INVENTION

Accordingly, an essential object of the present invention is to provide a pyroelectric type detecting device in which a pyroelectric type sensor element can be adjusted in position so as to detect light at a high S/N ratio and in an optimum state in accordance with a direction of incidence of the light, with substantial elimination of the disadvantages inherent in conventional pyroelectric type detecting devices of this kind.

In order to accomplish this object of the present invention, the present invention is characterized in that a pyroelectric type sensor element for detecting light such as infrared rays and an amplifier for amplifying an output signal of the pyroelectric type sensor element and outputting the amplified output signal at a low impedance are accommodated in one casing and the casing is rotatably mounted on a portion of a converging mirror. Namely, in the pyroelectric type detecting device of the present invention, the pyroelectric type sensor element and the amplifier are integrally accommodated in the casing so as to be electrically connected to each other in the casing, thereby eliminating change of stray capacitance between the pyroelectric sensor element and the amplifier.

In accordance with the present invention, since the pyroelectric type sensor element and the amplifier are electrically connected to each other in the casing which is, in turn, rotatably mounted on the portion of the converging mirror, there is no change of stray capacitance between the pyroelectric sensor element and the amplifier and infrared rays or the like can be detected at a high S/N ratio and in an optimum state through positional adjustment of the pyroelectric type sensor element.

BRIEF DESCRIPTION OF THE DRAWINGS

This object and features of the present invention will become apparent from the following description taken in conjunction with the preferred embodiment thereof with reference to the accompanying drawings, in which:

FIGS. 2 and 3 are left and right side elevational views of FIG. 1, respectively;

Before the description of the present invention proceeds, it is to be noted that like parts are designated by like reference numerals throughout several views of the accompanying drawings.

DETAILED DESCRIPTION OF THE INVENTION

Figure 1:
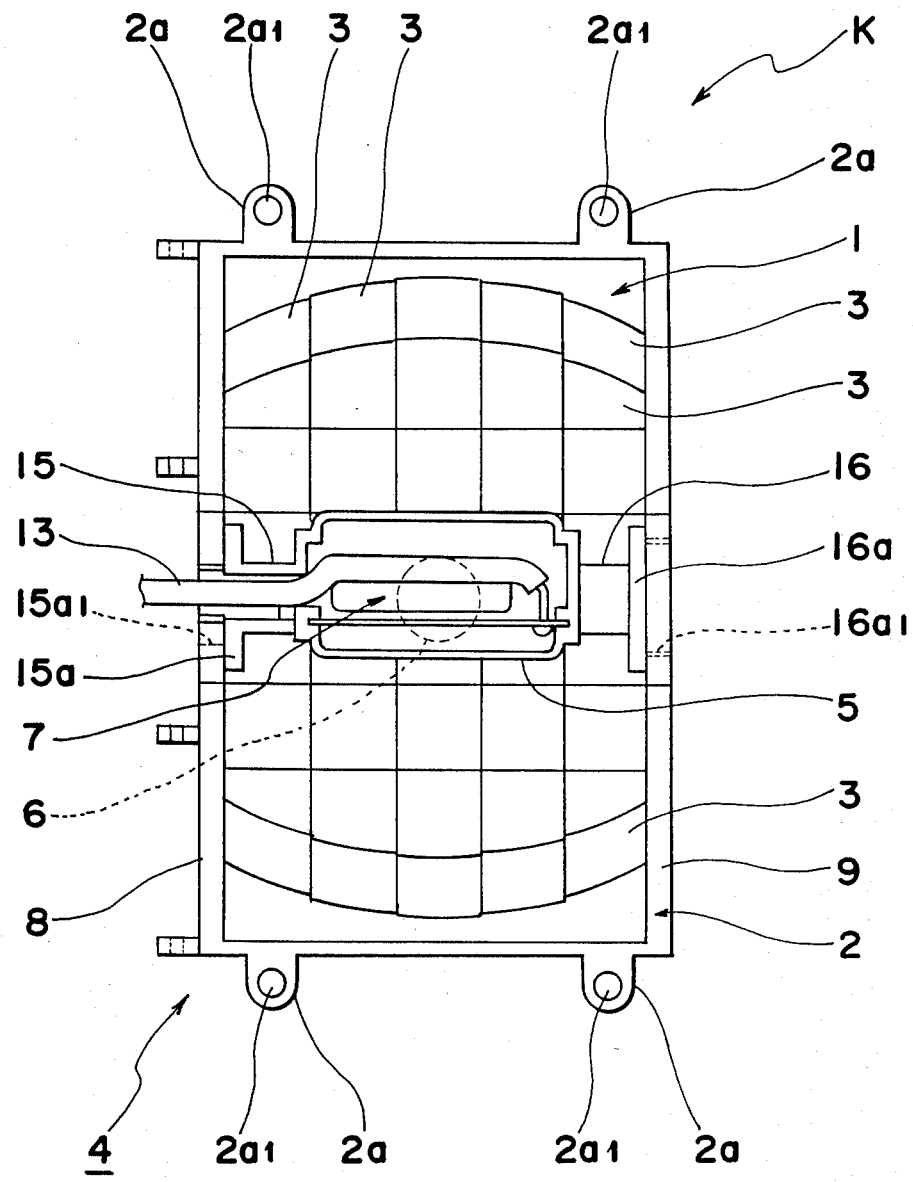
FIG. 1 is a top plan view of a pyroelectric type detecting device according to one embodiment of the present invention.

Referring now to the drawings, there is shown in FIGS. 1 to 3, a pyroelectric type detecting device K according to one embodiment of the present invention. The detecting device K is used for detecting human bodies and includes a converging mirror 4, a pyroelectric type infrared sensor 6 functioning as a pyroelectric type sensor element and an amplifier 7 for amplifying an output of the infrared sensor 6. In the converging mirror 4, a plurality of mirrors 3 for converging infrared rays of 5 to 20 μm in wavelength emitted from human bodies are attached to a bottom portion of a frame 2 made of synthetic resin, which is formed with a rectangular opening 1. The infrared sensor 6 and the amplifier 7 are accommodated in a casing 5.

As shown in FIGS. 2 and 3, the frame 2 includes a pair of side plates 8 and 9 of a hexagonal shape having two oblique sides extending inwardly and downwardly towards each other. The side plate 8a has a bottom side 8a and two oblique sides 8b disposed at opposite ends of the bottom side 8a, while the side plate 9 similarly has a bottom side 9a and two oblique sides 9b disposed at opposite ends of the bottom side 9a. Each of the bottom side 8a and the oblique sides 8b is formed with two recesses 10. Likewise, each of the bottom side 9a and the oblique sides 9b is formed with the two recesses 10. Each of the mirrors 3 is obtained by, for example, plating a surface of a plate made of metal or synthetic resin such that reflectance of the mirrors 3 is raised. Tabs 3a formed on the mirrors 3 are fitted into the recesses 10 of the side plates 8 and 9, respectively so as to secure the mirrors 3 to the bottom portion of the frame 2 such that the mirrors 3 define a portion of a spherical surface. Two lugs 2 extending outwardly from each of opposite ends of a rim of the opening 1 are formed on the frame 2 and are each formed with a hole 2a. The converging mirror 4 is secured to a member (not shown) by inserting screws through the holes 2a. Infrared rays emitted from the human bodies are converged by the mirrors 3 upon a spot disposed above a substantially central portion of the opening 1 of the frame 2. The converged infrared rays are incident upon the infrared sensor 6 accommodated in the casing 5.

Figure 4:
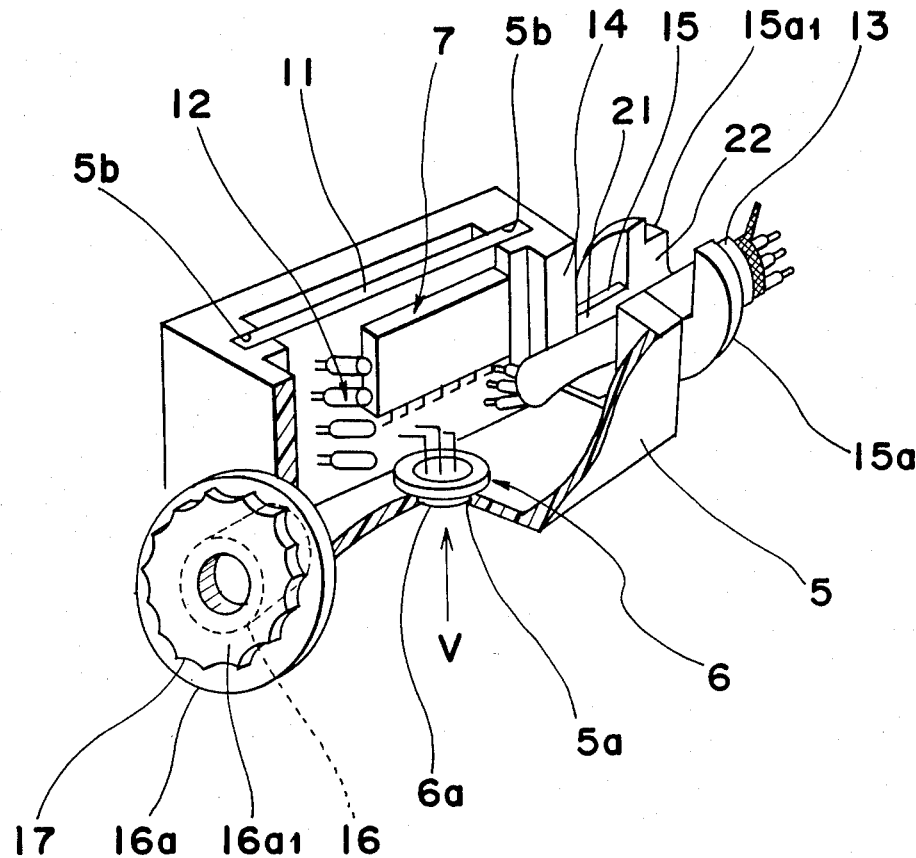
FIG. 4 is a partially cutaway perspective view of a casing employed in the pyroelectric type detecting device of FIG. 1.
Figure 5:
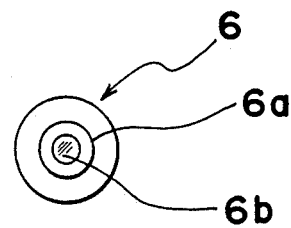
FIG. 5 is a view of a pyroelectric type infrared sensor employed in the pyroelectric type detecting device of FIG. 1, as observed in the direction of the arrow V in FIG. 4.

As shown in FIG. 4, the infrared sensor 6 is connected to a printed circuit board 11 accommodated in the casing 5. In order to obtain shielding effect against external noises, it is preferable that the casing 5 is made of electrically conductive synthetic resin. The infrared sensor 6 has a projection 6a formed with a window 6b (FIG. 5) for receiving light. The projection 6a is fitted into a bore 5a formed on the bottom portion of the casing 5 such that the window 6b confronts the mirrors 3. Thus, light reflected by the mirrors 3 is incident upon the window 6b from below. The printed circuit board 11 is inserted into two grooves 5b formed on inner faces of a pair of opposite walls of the casing 5 so as to be secured to the casing 5. Meanwhile, the amplifier 7 is constituted by a hybrid integrated circuit having an amplification factor of 60 to 80 dB. The amplifier 7 and elements 12 such as a capacitor, a resistor, etc. for the infrared sensor 6 are also connected to the printed circuit board 11. A shielding line 13 is extended from the printed circuit board 11 and includes a lead wire for receiving an output of the amplifier 7, a power line for supplying electric power to the amplifier 7, etc. The shielding wire 13 is drawn outwardly through a slot 14 formed on the casing 5 and through a hole of a support shaft 15 of the casing 5 to be described below.

The casing 5 has the support shafts 15 and 16 projecting outwardly from opposite ends thereof. The support shaft 15 is formed, at a distal end portion thereof, with a flange 15a. A circular projection 15a1 projecting from the flange 15a is supported between two arcuate bearing pieces 8c1 of a bearing portion 8c extending upwardly from a substantially central portion of the upper face of the side plate 8 as shown in FIG. 2. Meanwhile, the support shaft 16 is formed, at a distal end portion thereof, with a flange 16a. A projection 16a1 formed on the flange 16a is fitted into a circular hole 9c1 which is formed on a bearing portion 9c projecting upwardly from a substantially central portion of the upper face of the side plate 9. Thus, the casing 5 is pivotally supported at the support shafts 15 and 16, by the bearing portion 8c of the side plate 8 and the bearing portion 9c of the side plate 9.

In order to secure the casing 5 to the frame 2 after the casing 5 has been angularly adjusted relative to the frame 2, a plurality of circular notches 17 are formed around the outer periphery of the projection 16a1 at a substantially identical angular interval. Meanwhile, the bearing portion 9c of the side plate 9 of the frame 2 is formed, at a base portion thereof, with a slit 18. A ball 19 coupled with one end of a spring 20 is retractably inserted into the slit 18 so as to be urged towards the axis of the support shaft 16 by the spring 20. The ball 19 is depressed into one of the notches 17 of the projection 16a1 of the support shaft 16 by an urging force of the spring 20 so as to secure the casing 5 to the frame 2 after the casing 5 has been angularly adjusted relative to the frame 2.

As shown in FIG. 4, the shielding line 13 drawn outwardly from the slot 14 of the casing 5 is further outwardly extended through a groove 21 formed on the support shaft 15 and through a cavity 22 formed on the flange 15a of the support shaft 15. An external end of the shielding wire 13 is connected, by wrapping or brazing, to a monitor (not shown) for monitoring human bodies.

By the above described arrangement of the detecting device K, the infrared sensor 6 and the amplifier 7 are integrally accommodated in the casing 5. Therefore, even if the casing 5 is rotated relative to the frame 2 to positions I, II and III of FIGS. 2 and 3 in accordance with directions of approach of human bodies in the detection region, such an undesirable phenomenon does not take place that the lead wire connecting the infrared sensor 6 and the amplifier 7 is displaced with the result that its stray capacitance changes. Accordingly, in the detecting device K, by rotating the casing 5 relative to the frame 2 in accordance with directions of approach of human bodies, directions of incidence of infrared rays incident upon the window 6b of the infrared sensor 6 from the human bodies can be determined and detection sensitivity of the detecting device K can be so set as to reach its maximum when the human bodies pass through a predetermined area.

Meanwhile, the shielding wire 13 is also displaced upon rotation of the casing 5. However, since the shielding wire 13 is arranged to be drawn outwardly from the axis of the support shaft 15 acting as the rotational center of the casing 5, change of stray capacitance of the shielding wire 13 is minimized. Furthermore, since the shielding wire 13 is connected to the amplifier 7 having an output impendance far lower than that of the infrared sensor 6, level of signals transmitted by the shielding wire 13 is high and thus, there is substantially no change of the S/N ratio due to rotation of the casing 5.

Figure 6:
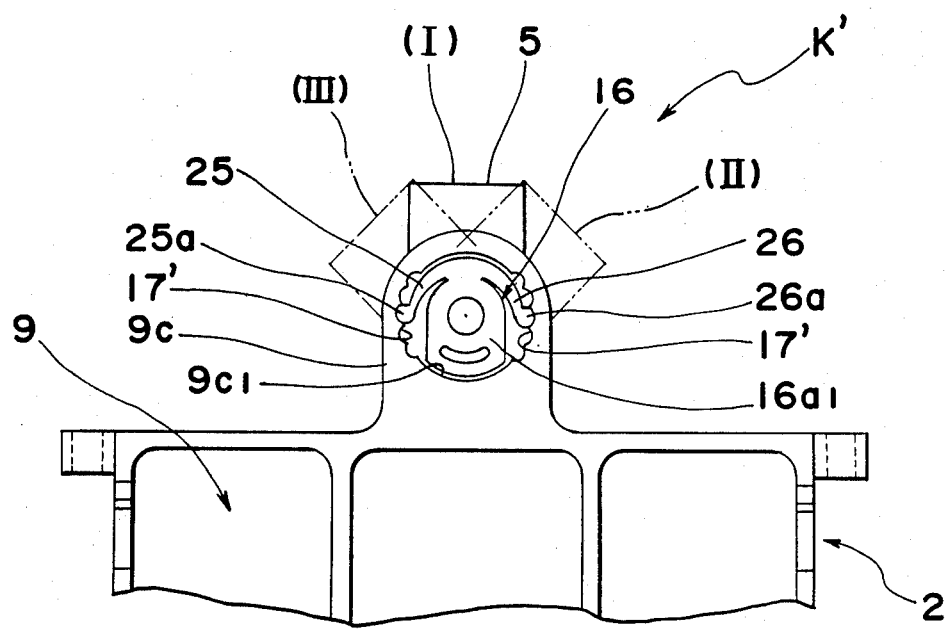
FIG. 6 is a view similar to FIG. 3, particularly showing a modification thereof.

In order to secure the casing 5 to the frame 2 after the casing 5 has been angularly adjusted relative to the frame 2, it can also be so arranged as shown in FIG. 6. In a modified pyroelectric type detectng device K' of FIG. 6, a plurality of notches 17' are formed on the circular hole 9c1 of the bearing portion 9c of the side plate 9 of the frame 2. Meanwhile, two elastic pieces 25 and 26 are formed on the projection 16a1 of the flange 16a of the support shaft 16 of the casing 5 and have spherical engageable portions 25a and 26a formed at distal end portions thereof, respectively such that the engageable portions 25a and 26a are brought into engagement with corresponding ones of the notches 17'.

Although the above described embodiment is directed to the pyroelectric type detecting device for detecting human bodies, the present invention is not limited to the pyroelectric type detecting device for detecting human bodies but can be modified variously. Furthermore, in the present invention, light to be detected includes far infrared rays and near infrared rays in addition to infrared rays.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A pyroelectric type detecting device comprising:
a converging mirror including a mirror member;
a pyroelectric type sensor element for detecting light converged by said converging mirror, which has a window for receiving the light;
an amplifier for amplifying an output signal of said sensor element into an amplified signal and outputting the amplified signal at a low impendance; and
a casing for accommodating said sensor element and said amplifier therein;
said casing being rotatably mounted on a portion of said converging mirror such that said window of said sensor element confronts said mirror member of said converging mirror.

2. A pyroelectric type detecting device as claimed in claim 1, further comprising a detent means for securing, when said casing has been rotated to a position relative to said converging mirror, said casing at the position.

3. A pyroelectric type detecting device as claimed in claim 2, wherein said detent means includes a spring fitted to said converging mirror, a ball attached to one end of said spring and a plurality of notches formed on said casing such that said ball is depressed into one of said notches by an urging force of said spring.

4. A pyroelectric type detecting device as claimed in claim 2, wherein said detent means includes an elastic piece formed on said casing and a plurality of notches formed on said converging mirror such that said elastic piece is brought into engagement with one of said notches.

* * * * *